United States Patent [19]

Plunguian et al.

[11] 3,995,086

[45] Nov. 30, 1976

[54] SHAPED ARTICLES OF HYDRAULIC CEMENT COMPOSITIONS AND METHOD OF MAKING SAME

[76] Inventors: Mark Plunguian, 6912 Columbia Drive; Charles E. Cornwell, 7104 Marlan Drive, both of Alexandria, Va. 22307

[22] Filed: June 27, 1975

[21] Appl. No.: 591,095

[52] U.S. Cl. .............................. 428/310; 428/409; 428/539; 156/245; 156/247; 264/338; 249/134
[51] Int. Cl.² ...................... B32B 5/18; B29B 1/00; B28B 7/36; B28B 7/34
[58] Field of Search ........... 428/409, 539, 310, 311, 428/446, 522, 538; 156/245–247, 243; 264/220, 228, 226, 227, 213, 74, DIG. 148, DIG. 57, 338; 259/107; 249/134

[56] References Cited
UNITED STATES PATENTS
3,965,233  6/1976  Ritter.............................. 264/338 X

*Primary Examiner*—Philip Dier

[57] ABSTRACT

Shaped articles such as tiles and panels are produced from calcium aluminate cement motars by casting in a mold with a glossy water-repellent synthetic polymer surface to yield castings with highly reflective glassy surfaces. The calcium aluminate layer need only be several mils thick with the rest of the mold volume being filled with other cementitious compositions. Color pigments may be added to the calcium aluminate slurry to yield castings with brilliant glassy colored surfaces.

9 Claims, No Drawings

SHAPED ARTICLES OF HYDRAULIC CEMENT COMPOSITIONS AND METHOD OF MAKING SAME

BACKGROUND OF THE INVENTION

A primary object of the invention is to provide a shaped article of cementitious material with a least one highly reflective glassy surface, useful for decorative and protective purposes such as indoor and outdoor wall panelling, roofing tiles on buildings, and the like.

Another object of the present invention is to provide a novel method for the production of shaped articles of cementitious material having highly reflective, glassy surfaces,

SUMMARY OF THE INVENTION

When aqueous slurries of hydraulic cements, such as portland cement, calcium aluminate cement, or gypsum cement, either neat or as a mortar, are cast in a mold, the cured castings assume the shape of the mold. If the surfaces of the mold are smooth, and these surfaces are treated with release agents, the surfaces of the castings are smooth, but are dull, nonreflective, nonglossy. We have now found that if the surfaces of the mold consist of a glassy synthetic polymer which is naturally repellent to aqueous compositions, such as polypropylene or polystyrene, and the cementitious material is calcium aluminate, then the casting, after curing, assumes a highly reflective glassy appearance wherever the aqueous slurry had been in contact with the reflective glossy polymeric composition. The calcium aluminate cement slurry not in contact with the glossy polymer surface, cures to a dull finish the same as the other cements.

Of all the hydraulic cements investigated, only calcium aluminate showed this property of assuming a highly reflective glassy surface upon curing the casting in a mold with a reflective glossy water-repellent polymeric surface. These are the so-called high-alumina cements obtained by fusing a mixture of aluminous and calcareous materials and grinding the resulting product to a fine powder. Two general types of calcium aluminate cements are produced commercially. One type is produced by fusing naturally occurring bauxite with limestone in a 1:1 molar ratio of lime to alumina. A typical analyses of such a cement by weight percent is 40% $Al_2O_3$, 38% CaO, 11% $Fe_2O_3$, 4% FeO, about 5% $SiO_2$, and about 2% $TiO_2$. The other type is made by fusing together pure alumina and lime to give a white hydraulic cement with a 1:2.5 molar ratio of lime to alumina. A typical analysis of such a cement by weight percent is 72% $Al_2O_3$ and 26% CaO. Either type may be used for our purpose.

Commercial examples of the first type are:
  Lumnite (Atlas Cement Company), and
  Fondu cement (Lone Star Lafarge Co.).
Commercial examples of the second type are:
  Alcoa cement CA-25 (Aluminum Corporation of America), and
  Secar 250 (Lone Star Lafarge Co.).

The glassy surfaces may be produced in any color by the addition to the calcium aluminate slurry color pigments which are insoluble in water, chemically inactive, are light fast, and are of fine particle size. These are generally the iron oxides for red, yellow, buff, brown, gray, and black; manganese oxide for black and brown; chromium oxide for green; and cobalt blue for blue. Titanium dioxide may be added to lighten the color of ferric oxide occurring in the bauxite, and to produce lighter pastel shades with the color pigments. Marble effects may be produced by blending.

The calcium aluminate slurry may be used neat or as a mortar with silica sand. Finely-divided silica particles give a harder, more durable, scratch-resistant surface, with the same highly reflective glassy surface properties. These fine particles may be produced by grinding or by using the naturally occurring microcrystalline silica, such as those located near Hot Springs, Arkansas (Novacite silicas, Malvern Minerals Company).

Calcium aluminate cements are more expensive than portland cement, or gypsum cement. It is therefore desirable to use calcium aluminate only for the surface. A layer of about 3–6 mils thick is sufficient to give the highly reflective glassy surface in any desired color. After applying the base coat of calcium aluminate slurry, either by slush coating, spraying or brushing, it is allowed to set for about 15 to 30 minutes. It is important not to allow this base coat to set completely and dry, since it then begins to flake off and does not yield the glassy finish. Then, while the prime coat is still moist, the mold is filled with the bulk of the cement. A portland cement mortar or concrete gives an overall strong, durable shaped article. For a lower density composition one of the light weight aggregates may be used with the portland cement, such as perlite or expanded shale. A preferred composition is to use a portland cement mortar with the addition of poly(vinyl acetate) emulsion. Without aeration, the poly(vinyl acetate) aids in increasing the strength of the composition and helps to bond the portland cement to the calcium aluminate layer. When this slurry is foamed by aeration, for example by means of the stirring and aerating device disclosed in our copending application Ser. No. 509,940, filed Sept. 27, 1974, the volume may be about doubled by the generation of stable air cells, thus greatly reducing the density of the composition.

The presently preferred synthetic polymer for the glossy repellent surface is polystyrene. Biaxially oriented sheeting may be thermoformed to the shape of the mold. This may be used as an insert to make repeated castings. After the surface loses its luster, a new insert is used, while the old plastic is reground and resheeted. Another approach is to spray a solution of polystyrene in toluene or xylene on the mold and leave a repellent glossy surface after evaporation of the solvent.

The invention will be further illustrated by the following examples, in which all parts are by weight. Other synthetic polymers with water repellent surfaces may be used, such as polypropylene.

DETAILED DESCRIPTION OF THE INVENTION

Table I

| Examples of compositions of variously colored glassy coatings, in parts by weight. | | | | | | | |
|---|---|---|---|---|---|---|---|
| Example No. | 1 | 2 | 3 | 4 | 5 | 6 | 7 |
| Alcoa cement CA-25 | 100 | — | — | — | — | — | — |
| Lumnite cement | — | 100 | 100 | 100 | 100 | 100 | 100 |

Table I-continued

| Examples of compositions of variously colored glassy coatings, in parts by weight. | | | | | | | |
|---|---|---|---|---|---|---|---|
| Novacite 200 silica | 50 | 50 | 100 | 50 | 20 | — | — |
| fine silica sand | — | — | — | — | 100 | 100 | 100 |
| chromic oxide green | 5 | — | 5 | — | — | — | — |
| cement black | — | 5 | — | — | — | — | — |
| ferric oxide red | — | — | — | 5 | 2.5 | — | — |
| titanium dioxide | — | — | — | — | — | — | 5 |
| water | 50 | 50 | 80 | 80 | 45 | 45 | 50 |
| anionic surfactant | 0.04 | 0.04 | 0.04 | 0.04 | 0.04 | 0.04 | 0.04 |

The slurry compositions shown in Table I were slush-coated in polystyrene molds. The excess slurry was poured off and the thin coatings were allowed to set for 20–30 minutes. A slurry was then mixed of 100 parts portland cement, 100 parts coarse sand, 100 parts fine sand, 80 parts water and 10 parts poly(vinyl acetate) emulsion. A thin coating of this mixture was applied over the calcium aluminate layer in the mold. The rest of the portland cement mixture was then aerated vigorously to foam and thus about double the volume. This low density dispersion was then used to fill the molds. After standing for 24 hours at room temperature, the cured pieces were removed from the molds. They showed variously colored highly reflective, glassy surfaces, corresponding to the shape of the molds. Example 1 was a light green color. Example 3 was a darker green. Example 2 was jet black. Examples 4 and 5 were different shades of red. Example 6 was brownish in color, while Example 7 was a very light buff color.

EXAMPLE 8

A slurry composition corresponding to Example 6 was slush-coated in a polystyrene mold. After a 30 minute set at room temperature, the mold was filled with a slurry of 200 parts gypsum cement in 85 parts water. The composition was allowed to cure for 24 hours. It was then removed to yield a casting with a brown, highly reflecting glassy surface.

EXAMPLE 9

A slurry composition corresponding to Example 3 was sprayed on the interior surfaces of a polystyrene mold to leave a thin uniform film of the calcium aluminate slurry. After 15 minutes at room temperature, the mold was filled with the portland cement composition used for examples 1 to 7. It was allowed to cure for 24 hours and was then removed from the mold to yield a casting with a highly reflective, glassy surface.

EXAMPLE 10

A 25% solution of polystyrene in toluene was sprayed into a steel mold. It was left at room temperature until the solvent had evaporated to leave a continuous glossy film of polystyrene. The treated mold was then used in a manner similar to the description in Example 9 and yielded after curing a casting with a highly reflective, glassy finish.

It should be appreciated that those skilled in the art could suggest various changes and modifications of the presently preferred embodiments of the invention after being apprised of this invention. It is intended to encompass all such changes and modifications as fall within the scope and spirit of the appended claims.

We claim:
1. A shaped article of calcium aluminate cementitious composition with a reflective glossy surface.
2. A shaped article according to claim 1 in which the reflective calcium aluminate cementitious composition is backed with a portland cement composition.
3. A shaped article according to claim 2 in which the portland cement composition contains polyvinyl acetate.
4. A shaped article according to claim 3 in which the portland cement composition is aerated.
5. A shaped article according to claim 1 in which the reflective calcium aluminate cementitious composition is backed by a gypsum cement composition.
6. A shaped article according to claim 1 in which the calcium aluminate cementitious composition comprises the addition of microcrystalline silica particles.
7. A shaped article according to claim 1 in which the calcium aluminate cementitious composition comprises the addition of color pigments.
8. A process for producing a shaped article of calcium aluminate cementitious composition with a reflective surface comprising the steps of forming an aqueous calcium aluminate cementitious slurry composition, casting this aqueous slurry in a synthetic polymer mold, or a steel mold lined with a synthetic polymer, said polymer being selected from the group comprising polystyrene and polypropylene, filling the mold with the aqueous cementitious composition, curing the casting thus formed, and then removing the cured casting from the mold.
9. A process for producing a shaped article with a reflective surface according to claim 8 comprising the steps of casting a thin coating of calcium aluminate aqueous composition in a synthetic polymer mold and completing the filling of the mold by backing this thin coating with a portland cement composition.

* * * * *